Figure 1:
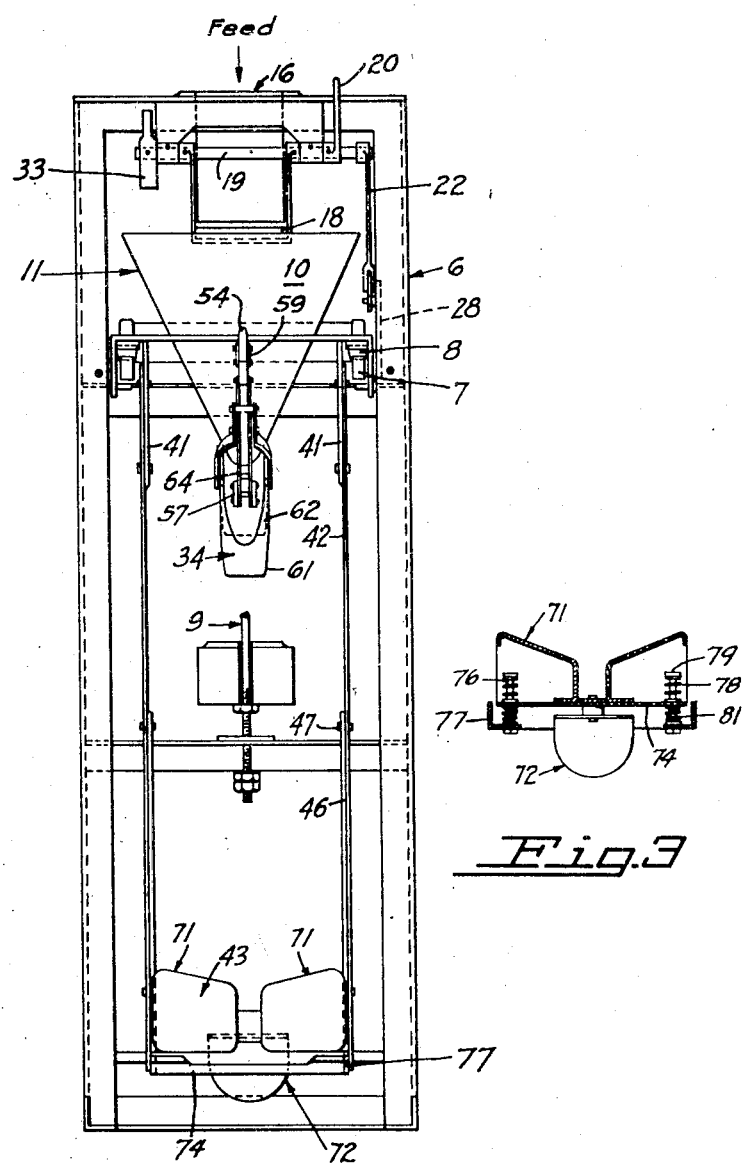

Jan. 4, 1949.   E. W. VREDENBURG   2,458,228
WEIGHING DEVICE WITH BAG FILLING
AND BAG VIBRATING MEANS

Filed Sept. 1, 1944   2 Sheets-Sheet 1

INVENTOR.
Edric W. Vredenburg
BY
ATTORNEY

INVENTOR.
Edric W. Vredenburg
BY
ATTORNEY

Patented Jan. 4, 1949

2,458,228

UNITED STATES PATENT OFFICE 2,458,228

WEIGHING DEVICE WITH BAG FILLING AND BAG VIBRATING MEANS

Edric W. Vredenburg, Berkeley, Calif.

Application September 1, 1944, Serial No. 552,279

3 Claims. (Cl. 226—55)

This is a continuation in part of my application Serial No. 484,400, filed April 24, 1943, now Patent Number 2,392,204 of January 1, 1946.

This invention relates to charge weighing and filling machines, particularly one for weighing a charge of a material to be loaded into a bag. The machine of this invention is particularly suited for filling that type of container known in the art as a valved bag, a term applied to a bag which is closed before filling except for a small filling opening or valve which is closed after filling.

It is in general the broad object of the invention to provide a machine which will rapidly and accurately weight a charge of material while the charge is being loaded by gravity into its final container. This manner of operation reduces the filling time to a minimum. The usual practice in gravity bag filling is to first weigh out the charge and, after it is weighed, discharge the weighed charge into a bag. When the bag has been filled and removed a new bag is brought into place. Then and only then is a new charge weighed out. As a consequence, the filling operation is comparatively slow. The machine of the present invention enables the weighing and filling operations to be conducted simultaneously.

The machine of the present invention involves and includes the use of a weighing mechanism for supporting an intermediate temporary storage receptacle or hopper. The hopper includes a spout for discharge of the charge into a container, usually a valved bag. The hopper and bag are mounted upon and carried by the weighing frame, the load of the empty bag and hopper being counterbalanced on the weighing frame so the charge of material in the hopper or in the bag can be weighed. The movement of the weighing frame is employed to control discharge of material from a source into the hopper, the frame cutting off discharge when the charge of a desired weight is contained either in the hopper or is in the bag.

The weighing and filling machine described will fill a bag in a period which is very short as compared to the period required by prior machines. I have found that the weighing-filling period can be further reduced by vibrating the hopper and bag support frame. The vibrator is provided as part of the support means for the bag bottom. When the vibrator is actuated with an empty bag in place, the vibration is imparted to the frame and speeds up flow from the hopper. As the bag fills, the material in it takes up the vibration and that of the frame is reduced. The effect of this is to pack the fill in the bag compactly and to reduce gradually the rate of discharge from the hopper. These two results follow each other, a very desirable feature enabling the feed to be increased and then reduced while the bag fill is compacted into a tight pack as it is placed in the bag.

The invention includes other objects and features of advantage, some of which, together with the foregoing, will appear hereinafter wherein the present preferred form of machine of this invention is disclosed.

In the drawing accompanying and forming a part hereof, Figure 1 is a front elevation, partly cut away to illustrate certain details of construction.

Figure 2:
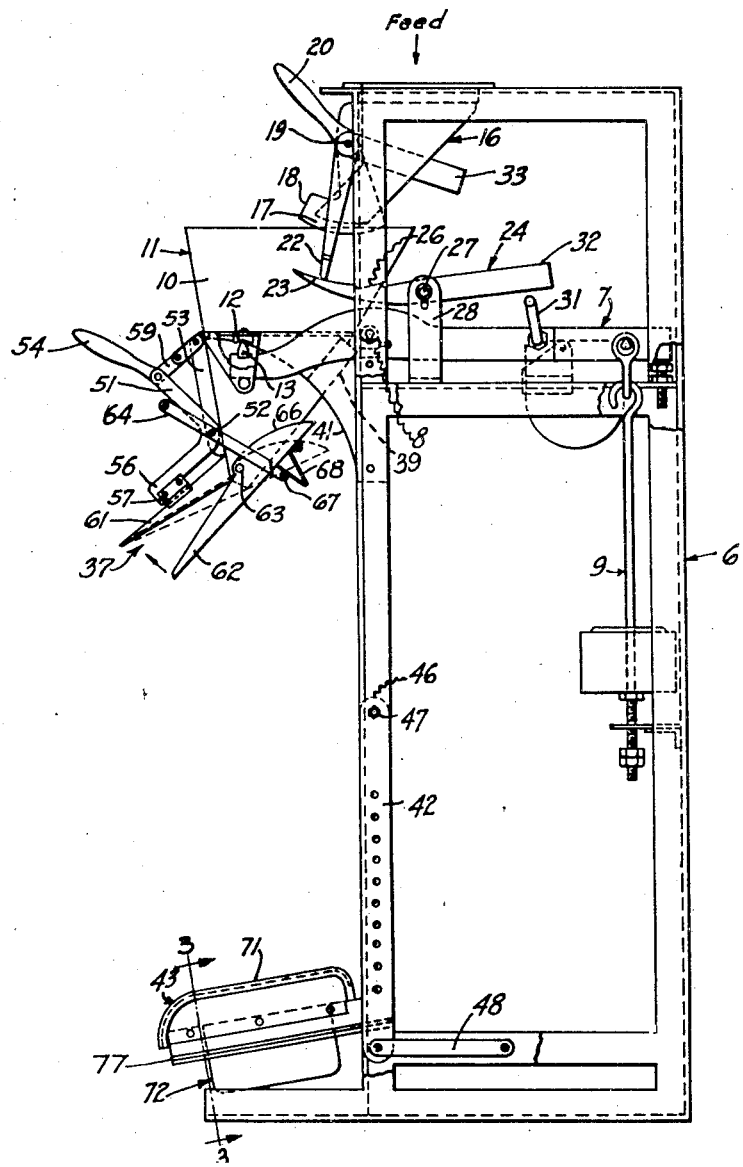

Figure 2 is a side elevation of the machine shown in Figure 1, while Figure 3 is a section along the line 3—3 of Figure 2 and showing the bag support and its vibrator.

Referring to Figure 1, I have provided a suitable supporting frame indicated generally at 6 for supporting the scale beam or weighing frame 7 in balance bearings or pivot blocks 8. The weighing frame has the form and configuration generally shown at 21 in Figure 3 in my Patent 2,314,299. A counterbalance 9 is hung on one end of the frame while a hopper structure generally indicated at 11 including a hopper 10 mounted by pivot blocks 12 on pivots 13 at the other end of the weighing frame. This type of mounting is shown and described in some detail in my aforesaid patent.

To provide for feed of material, a container 16 is provided above the hopper structure 11 in a position to discharge through opening 17 into hopper 10. A movable gate 18 is mounted on shaft 19 and is oscillated across opening 17 by handle 20 secured to shaft 19. Normally handle 20 is rocked counterclockwise (Figure 2) by an operator until lever 22 on shaft 19 has moved across arcuate face 23 on lever 24 until it drops into notch 26 on arcuate face 23.

The lever 24 is hinged intermediate its ends at 27 on a member 28 which is mounted on one side of the frame. The lever 24 is free to rock counterclockwise to admit the end of lever 22 into the notch; its clockwise movement is restricted by an adjustable stop 31 carried on the weighing frame below the extending end 32 of lever 24. This serves to release the engagement of lever 22 and notch 26, enabling counterweight 33 on shaft 19 to rock the shaft and gate 18 clockwise and shut off material flow.

The hopper 10, as appears in Figure 1, tapers in toward its bottom to direct the flow of material into filling spout generally indicated at 34 through a slot which is not shown but which extends completely across the hopper bottom. The spout 34 projects angularly across the hopper to direct flow downwardly through its discharge end 37 into a suitable container. In Figure 2 I have shown the spout in its discharge position. The upper end 39 of the spout preferably extends beyond the hopper and open to the atmosphere to enable a very high rate of discharge to be maintained from the hopper through the spout and into a container.

To support a positioned bag during filling, plates 41 are secured on each side of the hopper structure 11. Arms 42 are connected to the plates, the arms depending from the plates to support a rest generally indicated at 43 for a bag. The distance between the rest 43 and the spout 34 is adjusted to suit the size of the container being filled. This is achieved in the machine shown by providing side arms 46 on each side of the rest and connecting these by removable bolts 47 at desired points. The ends of arms 42 are guided by hinged links 48 connected to the arms and to the frame 6 to prevent the hopper structure and the rest from swinging about pivots 13, while allowing vertical movement.

In accordance with this invention, rest 43 includes two bag support plates 71. Each plate is mounted upon and is movable by a suitable vibrator means generally indicated at 72. I have utilized an electrical vibrator operating at several hundred vibrations per second with success. Different speeds and various vibratory means can be utilized and that shown is merely typical, air or other fluid being useful as well as merely mechanical vibration.

Suitable means are provided for retaining a container in filling position. The novel mechanism shown is particularly adapted for use with a valved bag. This includes bell crank 51 mounted at 52 between angle irons 53 secured on the front of hopper 10. One end of the bell crank 51 is formed as a handle 54 while the other end 56 is faced with rubber 57 and is curved to fit over the valve portion of a bag, and hold it securely against the spout. To hold the bell crank in bag retaining position, a toggle 59 is connected between the handle portion of the bell crank and the angle irons 53. This toggle is readily broken by an operator rocking handle 54 clockwise to release a bag, the toggle rocking inwardly to permit the bell crank to move. When another bag is positioned and handle 54 is rocked counterclockwise, the toggle moves into its locking position, that shown in Figure 2.

To facilitate positioning and filling of a valved bag, spout 34 is made with a fixed portion 61 and a movable portion 62 hinged on the hopper at 63 and biased to engage the fixed portion and close the opening in the hopper by its weighted end 66. The two spout portions fit together snugly when in closed position, being flat and thin in cross-section to provide a "duck-bill" spout readily inserted into a valved bag. Manipulation of handle 54 controls the spout opening and closing, levers 64 being hinged at 52 and extending in front of the handle. When the handle is raised to permit a bag to be inserted in place, the weighted end 66 of the movable portion causes the lower portion to move into the dotted line position of Figure 2, the closed position. When the handle 54 is moved to clamp a bag in place, roller 67 positioned between the levers 64 engages extension 68 on the movable portion and rocks it counterclockwise into open position. The flat "duck-bills" quickly spread open the valve into which they have been inserted.

The assistance of the vibratory means to the feed and to compact the bag fill is not confined to the particular hopper feed disclosed and various other gravity or positive feeding means can be utilized as can other bags and bag retainers.

In operation, with the vibrator operating, a bag in position and a supply of material available in container 16, an operator rocks the handle 20 to latch the gate 18 open. Material flows freely into hopper 10, through the spout and on into the container or bag, the vibrator assisting the flow by vibrating the hopper and spout. As the bag fills, the material in the bag takes up the vibration to an increasing extent, the hopper and spout vibrating less and less. This compacts the bagged material and slows the feed as the bag fills. When the weight of material in the hopper and in the bag equals that to be weighed out, or very nearly so, the frame 7 moves up and extension 31 moves lever 24 to release lever 22. The gate then swings shut. The material continues to flow from the hopper 10 but since most of it has already entered the bag, little further time is required before the bag can be removed and another placed in position. The operator then removes the bag after moving handle 54 to release position. Usually the vibrator is operated continuously. However, if desired, a switch mechanism can be included which is operated off the weighing frame as in my Patent No. 2,314,299 to control the vibration.

The vibrator construction is shown in detail in Figure 3. The plates 71 are secured to a frame 74 on which the vibrator 72 is also mounted between the plates. The plates are arcuately formed, sloping inwardly as appears in Figures 1 and 3 and being spaced apart so the bottom of the bag engages the plates and tends to jam down between them. This ensures an efficient transfer of the vibratory movement to the bag and its contents as the bag fills.

The frame 74 is mounted on rods 76. These are secured to arms 77 which extend from side arms 46. Springs 78 are provided between the frame 74 and ends 79 on the rods while springs 81 are provided between arms 77 and the frame 74, a flexible and resilient mounting which will transmit vibration to the hopper and spout when substantially little load is on the frame 74 and which will transmit a greater degree of vibration to the frame 74 as springs 81 are compressed.

Instead of using a hopper constructed to discharge into a bag by gravity, one can use additional means to assist flow from the hopper to the bag. For example, one can employ the feeder mechanism shown in the Augustin Patent 2,101,232.

I claim:

1. In a machine for filling bags and similar receptacles, a supporting frame, spaced balance bearings on said frame, a scale beam resting on said balance bearings, a feeding hopper supported at one end of said scale beam and having an outlet, a frame suspended from said hopper, means for securing a bag to said outlet, means carried by said last mentioned frame for supporting engagement with the bottom of a bag secured to said outlet, and vibrating means supported on said bag bottom support means for vibrating said bag bottom support means, said last mentioned frame, scale beam and said hopper simultaneously to facilitate discharge of material from said hopper into a bag and to pack the material in a bag supported between said hopper and said bag bottom support means.

2. In a machine for filling bags and similar receptacles, a supporting frame, spaced balance bearings on said frame, a scale beam resting on said balance bearings, a feeding hopper supported at one end of said scale beam and having an outlet, a frame suspended from said hopper, means carried by said last mentioned frame for supporting the bottom of a bag positioned for filling through said outlet, and means supported on said bag bottom support means for vibrating said bag bottom support means, said last mentioned frame, scale beam and said hopper simultaneously to facilitate discharge of material from said hopper into a bag and to pack the material in a bag supported between said hopper and said bag bottom support means.

3. In a machine for filling bags and similar receptacles, a supporting frame, spaced balance bearings on said frame, a scale beam resting on said balance bearings, a feeding hopper supported on said scale beam and having an outlet for filling a bag, a frame suspended from said hopper, a bag bottom support platform on said last mentioned frame including a pair of spaced members positioned to engage opposite sides of a bag bottom, and a vibrating means carried on and beneath said pair of spaced members for vibrating said members, said last mentioned frame, scale beam and said hopper simultaneously to facilitate discharge of material from said hopper into a bag and to pack the material in a bag supported between said hopper and said bag bottom support means.

EDRIC W. VREDENBURG.

REFERENCES CITED

The following references are of record in the file of this patent:

UNITED STATES PATENTS

| Number | Name | Date |
|---|---|---|
| 655,322 | Bates | Aug. 7, 1900 |
| 1,140,867 | Bates | May 25, 1915 |
| 1,258,029 | McNeill | Mar. 5, 1918 |
| 2,004,593 | Andreas | June 11, 1935 |
| 2,034,972 | Carlson | Mar. 24, 1936 |
| 2,101,232 | Augustin | Dec. 7, 1937 |
| 2,141,738 | DeBois | Dec. 27, 1938 |
| 2,314,299 | Vredenburg | Mar. 16, 1943 |

FOREIGN PATENTS

| Number | Country | Date |
|---|---|---|
| 20,975/35 | Australia | Jan. 17, 1935 |
| 685,929 | Germany | Dec. 29, 1939 |
| 441,431 | Great Britain | Jan. 20, 1936 |